(12) United States Patent
Branson et al.

(10) Patent No.: US 8,990,628 B2
(45) Date of Patent: Mar. 24, 2015

(54) UNFUSING A FAILING PART OF AN OPERATOR GRAPH

(71) Applicant: International Business Machines Corporation, Armonk, NY (US)

(72) Inventors: Michael J. Branson, Rochester, MN (US); John M. Santosuosso, Rochester, MN (US); Brandon W. Schultz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 146 days.

(21) Appl. No.: 13/706,078

(22) Filed: Dec. 5, 2012

(65) Prior Publication Data

US 2013/0166948 A1    Jun. 27, 2013

Related U.S. Application Data

(63) Continuation of application No. 13/334,348, filed on Dec. 22, 2011.

(51) Int. Cl.
  *G06F 11/00*  (2006.01)
  *G06F 11/07*  (2006.01)
  *G06F 11/34*  (2006.01)

(52) U.S. Cl.
  CPC ........ *G06F 11/0793* (2013.01); *G06F 11/0709* (2013.01); *G06F 11/3433* (2013.01); *G06F 11/0754* (2013.01)
  USPC ...................................... 714/38.1

(58) Field of Classification Search
  USPC .............. 714/10, 25, 38.1; 709/231; 718/100, 718/101, 103, 106
  See application file for complete search history.

(56) References Cited

U.S. PATENT DOCUMENTS

| | | | | |
|---|---|---|---|---|
| 4,972,314 | A * | 11/1990 | Getzinger et al. | 711/149 |
| 6,654,907 | B2 * | 11/2003 | Stanfill et al. | 714/16 |
| 6,658,477 | B1 * | 12/2003 | Lisitsa et al. | 709/231 |
| 6,714,904 | B1 | 3/2004 | Torvalds et al. | |
| 7,086,066 | B2 | 8/2006 | Kappel et al. | |
| 7,487,433 | B2 | 2/2009 | Sivakumar et al. | |
| 2002/0184292 | A1 | 12/2002 | Lal | |
| 2006/0282534 | A1 | 12/2006 | Berg | |
| 2009/0150890 | A1 * | 6/2009 | Yourst | 718/102 |

(Continued)

OTHER PUBLICATIONS

Branson et al.: "Unfusing a Failing Part of an Operator Graph"; U.S. Appl. No. 13/334,348, filed Dec. 22, 2011.

*Primary Examiner* — Scott Baderman
*Assistant Examiner* — Joseph Kudirka
(74) *Attorney, Agent, or Firm* — Patterson & Sheridan, LLP

(57) ABSTRACT

Techniques for managing a fused processing element are described. Embodiments receive streaming data to be processed by a plurality of processing elements. Additionally, an operator graph of the plurality of processing elements is established. The operator graph defines at least one execution path and wherein at least one of the processing elements of the operator graph is configured to receive data from at least one upstream processing element and transmit data to at least one downstream processing element. Embodiments detect an error condition has been satisfied at a first one of the plurality of processing elements, wherein the first processing element contains a plurality of fused operators. At least one of the plurality of fused operators is selected for removal from the first processing element. Embodiments then remove the selected at least one fused operator from the first processing element.

6 Claims, 7 Drawing Sheets

(56) References Cited

U.S. PATENT DOCUMENTS

| | | | |
|---|---|---|---|
| 2009/0217020 A1* | 8/2009 | Yourst | 712/245 |
| 2010/0186019 A1* | 7/2010 | Branson et al. | 718/104 |
| 2010/0293532 A1* | 11/2010 | Andrade et al. | 717/140 |
| 2012/0215934 A1* | 8/2012 | Barsness et al. | 709/231 |
| 2013/0031556 A1* | 1/2013 | Branson et al. | 718/103 |

* cited by examiner

UNFUSING A FAILING PART OF AN OPERATOR GRAPH

CROSS-REFERENCED TO RELATED APPLICATIONS

This application is a continuation of co-pending U.S. patent application Ser. No. 13/334,348, filed Dec. 22, 2011. The aforementioned related patent application is herein incorporated by reference in its entirety.

BACKGROUND

Embodiments of the present invention generally relate to stream computing applications. Specifically, the invention relates to techniques for unfusing an operator from within a processing element of a stream computing application.

While computer databases have become extremely sophisticated, the computing demands placed on database systems have also increased at a rapid pace. Database systems are typically configured to separate the process of storing data from accessing, manipulating or using data stored in the database. More specifically, databases use a model where data is first stored, then indexed, and finally queried. However, this model cannot meet the performance requirements of some real-time applications. For example, the rate at which a database system can receive and store incoming data limits how much data can be processed or otherwise evaluated. This, in turn, can limit the ability of database applications to process large amounts of data in real-time.

SUMMARY

Embodiments described herein provide a method, system and computer program product for managing a processing element. The method, system and computer program product include receiving streaming data to be processed by a plurality of processing elements. Additionally, the method, system and computer program product include establishing an operator graph of the plurality of processing elements, the operator graph defining at least one execution path and wherein at least one of the processing elements of the operator graph is configured to receive data from at least one upstream processing element and transmit data to at least one downstream processing element. The method, system and computer program product also include detecting an error condition has been satisfied at a first one of the plurality of processing elements, wherein the first processing element contains a plurality of fused operators. Further, the method, system and computer program product include selecting at least one of the plurality of fused operators for removal from the first processing element. The method, system and computer program product additionally include removing the selected at least one fused operator from the first processing element.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
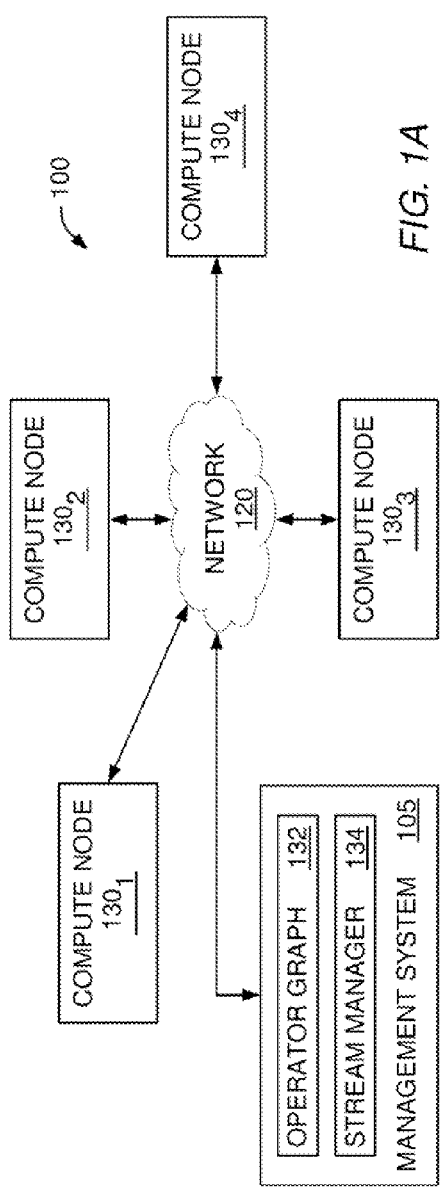
FIGS. 1A-1B illustrate a computing infrastructure configured to execute a stream computing application, according to one embodiment described herein.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in milliseconds. Constructing an application using this type of processing has opened up a new programming paradigm that will allow for a broad variety of innovative applications, systems and processes to be developed, as well as present new challenges for application programmers and database developers.

In a stream computing application, operators are connected to one another such that data flows from one operator to the next (e.g., over a TCP/IP socket). Scalability is reached by distributing an application across nodes by creating many small executable pieces of code (i.e., processing elements), each of one which contains one or more processing modules (i.e., operators). These processing elements can also be replicated on multiple nodes with load balancing among them. Operators in a stream computing application can be fused together to form a processing element. Additionally, multiple processing elements can be grouped together to form a job. Doing so allows processing elements to share a common process space, resulting in much faster communication between operators than is available using inter-process communication techniques (e.g., using a TCP/IP socket). Further, processing elements can be inserted or removed dynamically from an operator graph representing the flow of data through the stream computing application.

One advantage of stream computing applications is that they allow the user to granularly control the process flow of data through the application. In other words, the user may designate specific operators to perform various operations on the incoming data, and may dynamically alter the stream computing application by modifying the operators and the order in which they are performed. Additionally, stream computing applications are able to handle large volumes of data.

However, because stream computing applications often deal with large volumes of data, the processing of which is spread over multiple processing elements across multiple compute nodes, an operator may need to produce an output faster than it is able. Instead of requiring an operator to generate output data by processing currently received input data, an operator may instead output predetermined data. This predetermined data (or predicted output data) may be based on, for example, an average of the output data that was previously processed and transmitted by the operator. Moreover, the operator may only transmit predicted output data if the previously processed output data falls within an acceptable range. That is, if the previous output data is deterministic. An operator, or data flowing out of the operator, is "deterministic" if the values of the output data can be predicted with some minimum amount of confidence. For example, output data may be predictable or deterministic because a certain input always yields a certain output or because the output data typically has a value within a certain range—e.g., the output values for an operator are within a predefined range 80% of the time. Once the output data is deemed deterministic, using the predicted output data may allow the operator to transmit output data faster, or with less processing, than it otherwise would be able.

Moreover, the operator may output predetermined data only if there is a need to limit or stop processing received input data. For example, the stream computing application may be experiencing backpressure. "Backpressure" is a term used to describe one or more operators that are unable to transmit or receive additional data because either their buffer or a buffer associated with a downstream operator is full. In the case of some real-time applications, the operator may trade accuracy for increased data throughput where the time required for data to propagate through the stream computing application is an important factor.

One advantage of stream computing is that processing elements can be quickly moved into and out of the operator graph. Additionally, a processing element can contain a plurality of fused operators that are encapsulated within a single process running on a compute node. By fusing multiple operators together in a single process, these operators may be able to communicate with one another very efficiently, relative to a configuration where each operator is running in a separate process on the same compute node or a different compute node. However, certain problems may arise in a processing element containing a collection of fused operators. For example, consider an embodiment where the processing element is implemented as a Java application containing a plurality of operators, each running in a separate thread. In such an embodiment, a problem could arise when one of the operators begins consuming a substantial amount of memory, to the point that the Java application process grows too large and exceeds its allocated maximum amount of memory.

As such, embodiments provide techniques for managing a fused processing element. Embodiments may receive streaming data to be processed by a plurality of processing elements. Additionally, an operator graph of the plurality of processing elements is established. Generally, the operator graph defines at least one execution path between the processing elements in the plurality of processing elements. Furthermore, at least one of the processing elements of the operator graph is configured to receive data from at least one upstream processing element and transmit data to at least one downstream processing element. Embodiments may detect when an error condition has been satisfied by a first one of the plurality of processing elements, where the first processing element is a fused processing element comprising a plurality of fused operators. Generally, a fused processing element is a processing element having a plurality of operators all contained within a single process executing on a compute node. Embodiments may then select at least one of the plurality of fused operators for removal from the first processing element. For example, embodiments could identify one or more operators causing the error condition and could select these operators for removal from the first processing element. As another example, embodiments could determine a relative priority of each of the operators within the fused processing element and could select one or more operators having the lowest relative priorities. Embodiments may then remove the selected at least one fused operator from the first processing element. Advantageously, doing so allows for problems with the processing element to be corrected by removing selective ones of the fused operators within the processing element, and may do so without interrupting the processing of the other fused operators within the processing element.

Figure 1B:
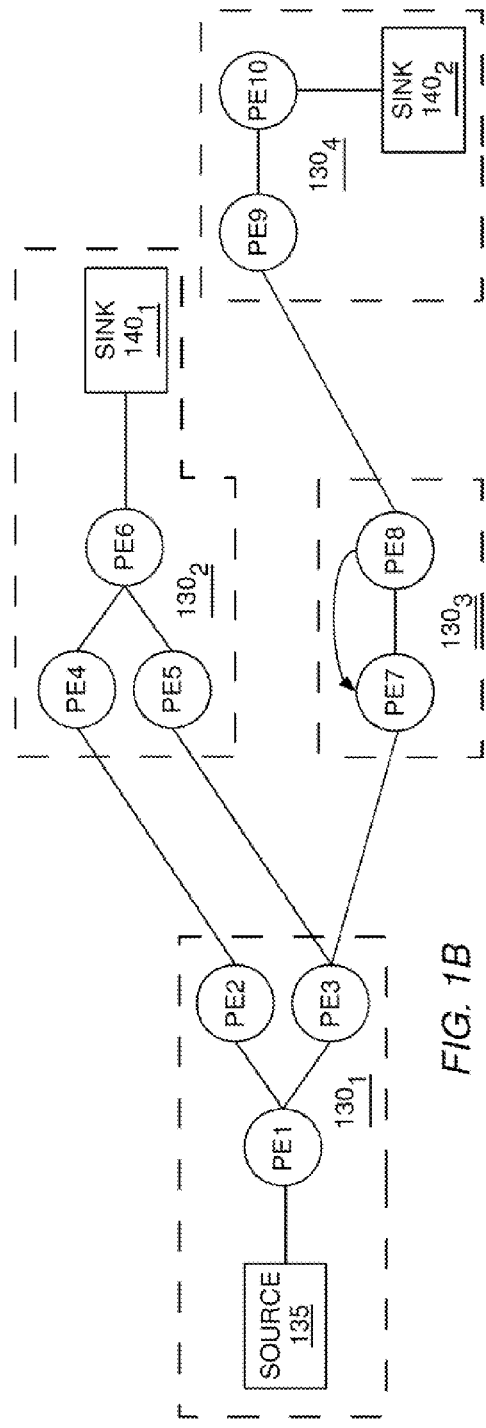

FIGS. 1A-1B illustrate a computing infrastructure configured to execute a stream computing application, according to one embodiment of the invention. As shown, the computing infrastructure 100 includes a management system 105 and a plurality of compute nodes $13_{0_{1-4}}$, each connected to a communications network 120. Also, the management system 105 includes an operator graph 132 and a stream manager 134. As described in greater detail below, the operator graph 132 represents a stream computing application beginning from one or more source processing elements (PEs) through to one or more sink PEs. This flow from source to sink is also generally referred to herein as an execution path. However, an operator graph may be a plurality of linked together executable units (i.e., processing elements) with or without a specified source or sink. Thus, an execution path would be the particular linked together execution units that data traverses as it propagates through the operator graph.

Generally, data attributes flow into a source PE of a stream computing application and are processed by that PE. Typically, processing elements receive an N-tuple of data attributes from the stream as well as emit an N-tuple of data attributes into the stream (except for a sink PE where the stream terminates). Of course, the N-tuple received by a processing element need not be the same N-tuple sent downstream. Additionally, the processing elements could be configured to receive or emit data in formats other than a tuple (e.g., the processing elements could exchange data marked up as XML documents). Furthermore, each processing element may be configured to carry out any form of data processing functions on the received tuple, including, for example, writing to database tables or performing other database operations such as data joins, splits, reads, etc., as well as performing other data analytic functions or operations.

The stream manager 134 may be configured to monitor a stream computing application running on the compute nodes $130_{1-4}$, as well as to change the structure of the operator graph 132. The stream manager 134 may move processing elements (PEs) from one compute node 130 to another, for example, to manage the processing loads of the compute nodes 130 in the computing infrastructure 100. Further, stream manager 134 may control the stream computing application by inserting, removing, fusing, un-fusing, or otherwise modifying the processing elements (or what data-tuples flow to the processing elements) running on the compute nodes $130_{1-4}$. One example of a stream computing application is IBM®'s InfoSphere® Streams (note that InfoSphere® is a trademark of International Business Machines Corporation, registered in many jurisdictions worldwide).

FIG. 1B illustrates an example operator graph that includes ten processing elements (labeled as PE1-PE10) running on the compute nodes $130_{1-4}$. Of note, because a processing element is a collection of fused operators, it is equally correct to describe the operator graph as execution paths between specific operators, which may include execution paths to different operators within the same processing element. FIG. 1B illustrates execution paths between processing elements for the sake of clarity. While a single operator within a processing element may be executed as an independently running process with its own process ID (PID) and memory space, multiple operators may also be fused together into a processing element to run as a single process (with a PID and memory space). In cases where two (or more) operators are running in independent processing elements, inter-process communication may occur using a "transport" (e.g., a network socket, a TCP/IP socket, or shared memory). However, when operators are fused together, the operators within a processing element can use more rapid communication techniques for passing tuples (or other data) between the operators.

As shown, the operator graph begins at a source 135 (that flows into the processing element labeled PE1) and ends at sink $140_{1-2}$ (that flows from the processing elements labeled as PE6 and PE10). Compute node $130_1$ includes the processing elements PE1, PE2 and PE3. Source 135 flows into the processing element PE1, which in turn emits tuples that are received by PE2 and PE3. Of note, although the operators within the processing elements are not shown in FIG. 1B, in one embodiment the data tuples flow between operators within the processing elements rather than between the processing elements themselves. For example, one or more operators within PE1 may split data attributes received in a tuple and pass some data attributes to one or more other operators within PE2, while passing other data attributes to one or more additional operators within PE3. Data that flows to PE2 is processed by the operators contained in PE2, and the resulting tuples are then emitted to PE4 on compute node $130_2$. Likewise, the data tuples emitted by PE4 flow to sink PE6 $140_1$. Similarly, data tuples flowing from PE3 to PE5 (i.e., from operator(s) within PE3 to operator(s) within PE5) also reach sink PE6 $140_1$. Thus, in addition to being a sink for this example operator graph, PE6 could be configured to perform a join operation, combining tuples received from PE4 and PE5. This example operator graph also shows data tuples flowing from PE3 to PE7 on compute node $130_3$, which itself shows data tuples flowing to PE8 and looping back to PE7. Data tuples emitted from PE8 flow to PE9 on compute node $130_4$, which in turn emits tuples to be processed by sink PE10 $140_2$.

Furthermore, although embodiments of the present invention are described within the context of a stream computing application, this is not the only context relevant to the present disclosure. Instead, such a description is without limitation and is for illustrative purposes only. Of course, one of ordinary skill in the art will recognize that embodiments of the present invention may be configured to operate with any computer system or application capable of performing the functions described herein. For example, embodiments of the invention may be configured to operate in a clustered environment with a standard database processing application.

Figure 2:
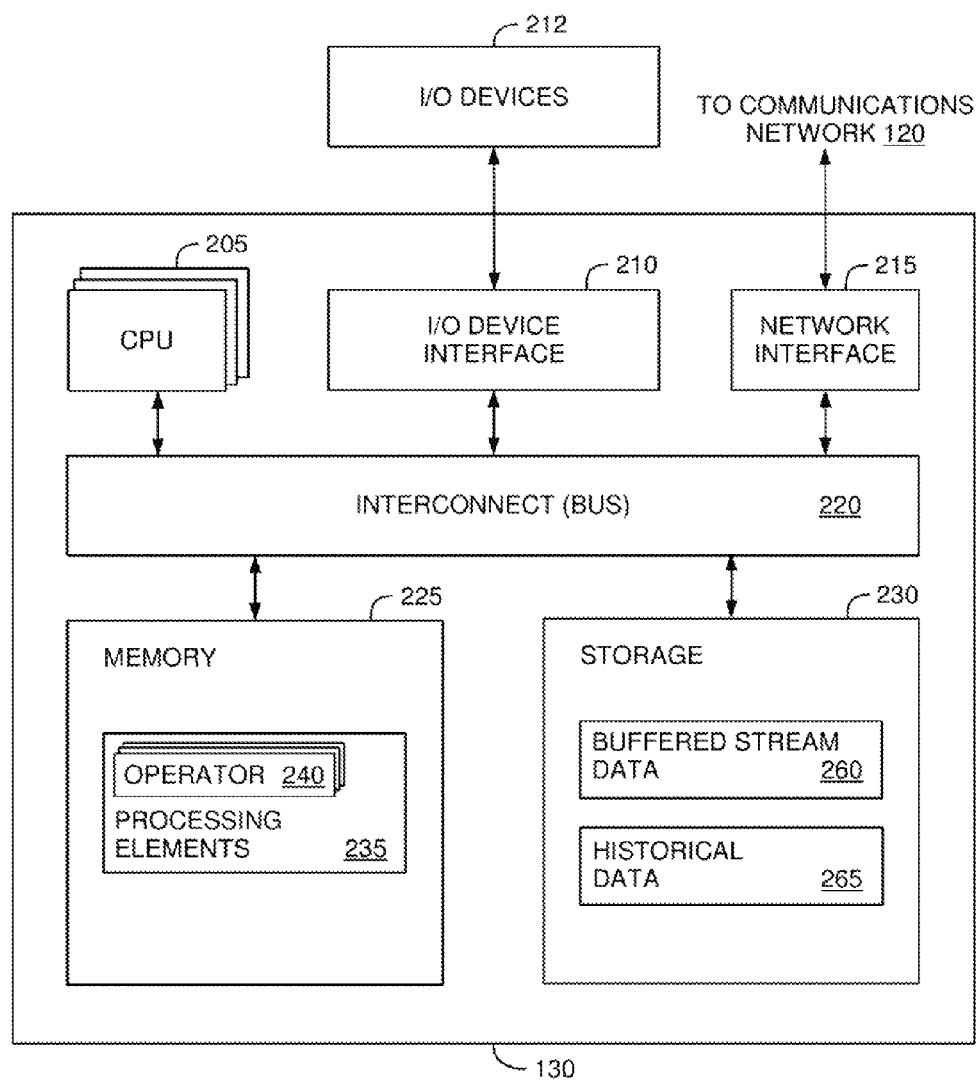
FIG. 2 is a more detailed view of the compute node of FIGS. 1A-1B, according to one embodiment described herein.

FIG. 2 is a more detailed view of the compute node 130 of FIGS. 1A-1B, according to one embodiment of the invention. As shown, the compute node 130 includes, without limitation, at least one CPU 205, a network interface 215, an interconnect 220, a memory 225, and storage 230. The compute node 130 may also include an I/O devices interface 210 used to connect I/O devices 212 (e.g., keyboard, display and mouse devices) to the compute node 130.

Each CPU 205 retrieves and executes programming instructions stored in the memory 225. Similarly, the CPU 205 stores and retrieves application data residing in the memory 225. The interconnect 220 is used to transmit programming instructions and application data between each CPU 205, I/O devices interface 210, storage 230, network interface 215, and memory 225. CPU 205 is included to be representative of a single CPU, multiple CPUs, a single CPU having multiple processing cores, and the like. The memory 225 is generally included to be representative of a random access memory (e.g., DRAM or Flash). Storage 230, such as a hard disk drive, solid state disk (SSD), or flash memory storage drive, may store non-volatile data.

In this example, the memory 225 includes a plurality of processing elements 235. The processing elements 235 include a collection of operators 240. As noted above, each operator 240 may provide a small chunk of code configured to process data flowing into a processing element (e.g., PE 235) and to emit data to other operators 240 in that PE and to other processing elements in the stream computing application. In the context of the present disclosure, a plurality of operators 240 may be fused in a processing element 235, such that all of the operators 240 are encapsulated in a single process running on the compute node 130. For example, each operator 240 could be implemented as a separate thread, such that all of the operators 240 can be run in parallel within a single process. The processing elements may be on the same compute node 130 or on other compute nodes accessible over the data communications network 120. Memory 225 may also contain stream connection data (not shown) which represents the connections between PEs on compute node 130 (e.g., a TCP/IP socket connection between two separate PEs 235), as well as connections to other compute nodes 130 with upstream and or downstream PEs in the stream computing application, also via TCP/IP sockets (or other inter-process data communication mechanisms).

As shown, storage 230 contains buffered stream data 260 and historical data 265. The buffered stream data 260 represents a storage space for data flowing into the compute node 105 from upstream processing elements (or from a data source for the stream computing application). For example, buffered stream data 260 may include data tuples waiting to be processed by one of the PEs 235—i.e., a buffer. Buffered stream data 260 may also store the results of data processing performed by processing elements 235 that will be sent to downstream processing elements. For example, a PE 235 may have to store tuples intended for a downstream PE 235 if that PE 235 already has a full buffer, which may occur when the operator graph is experiencing backpressure. Storage also contains historical data 265, which represents previous output values from the various processing elements 235 in the stream computing application. Such historical data 265 could be used, for instance, to determine a substitute output for a particular PE 235 which could be used as output for the PE 235 instead of the normal output from the PE 235 processing current input values. Such substitute output can be, for example, the average of a plurality of previously computed output values or the output value that corresponds to a particular input value received by the PE 235. Additionally, the historical data 265 may specify execution characteristics of the processing elements 235 across the node 130 or other nodes within the stream computing environment. Such characteristics may include workload information such as CPU usage, memory usage, and network usage, as well as system information describing the node on which the respective processing element 235 was executed (e.g., type of CPU, number of CPUs, type of memory, amount of memory, amount of storage, network connectivity, installed applications, etc.).

Figure 3:
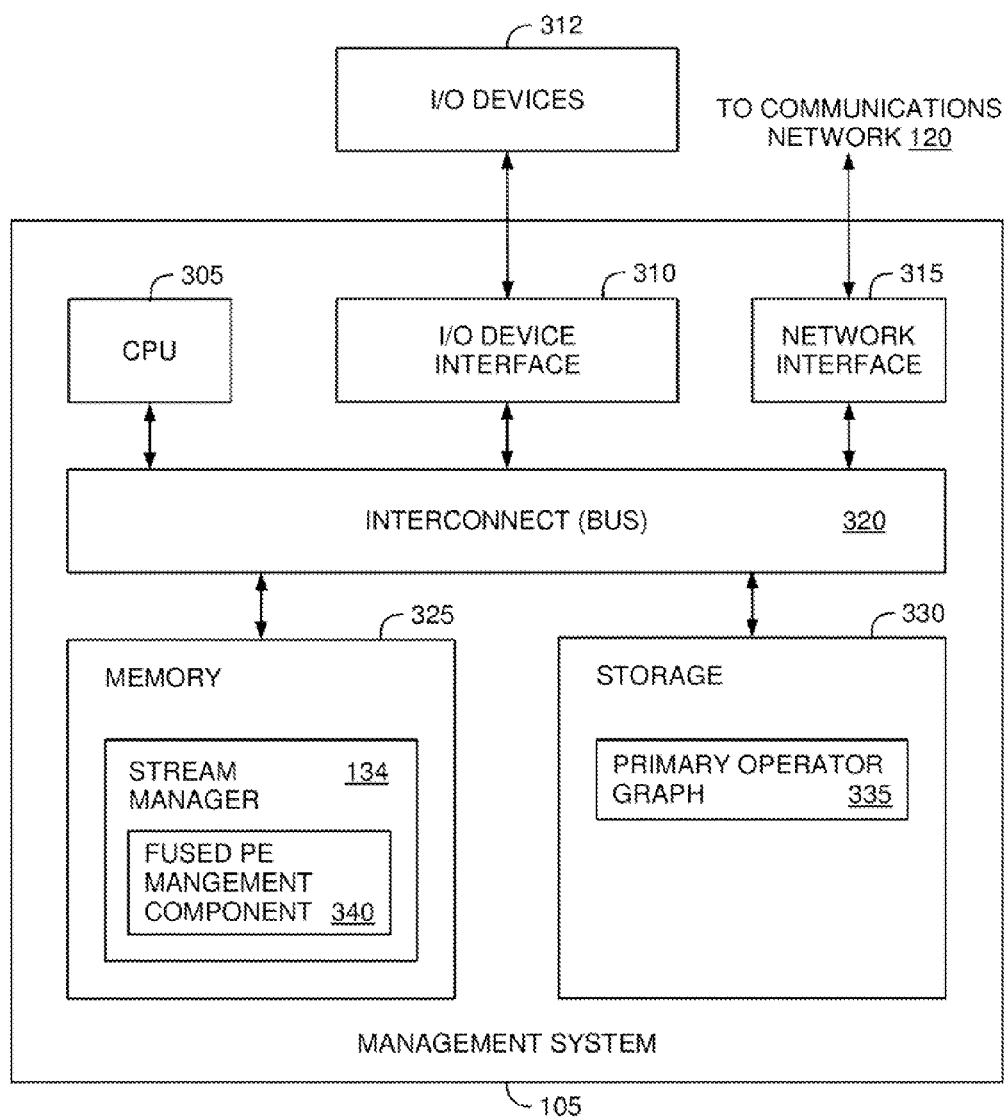
FIG. 3 is a more detailed view of the server computing system of FIG. 1, according to one embodiment described herein.

FIG. 3 is a more detailed view of the server computing system 105 of FIG. 1, according to one embodiment of the invention. As shown, server computing system 105 includes, without limitation, a CPU 305, a network interface 315, an interconnect 320, a memory 325, and storage 330. The client system 130 may also include an I/O device interface 310 connecting I/O devices 312 (e.g., keyboard, display and mouse devices) to the server computing system 105.

Like CPU 205 of FIG. 2, CPU 305 is configured to retrieve and execute programming instructions stored in the memory 325 and storage 330. Similarly, the CPU 305 is configured to store and retrieve application data residing in the memory 325 and storage 330. The interconnect 320 is configured to move data, such as programming instructions and application data, between the CPU 305, I/O devices interface 310, storage unit 330, network interface 305, and memory 325. Like CPU 205, CPU 305 is included to be representative of a single CPU, multiple CPUs, a single CPU having multiple processing cores, and the like. Memory 325 is generally included to be representative of a random access memory. The network interface 315 is configured to transmit data via the communications network 120. Although shown as a single unit, the storage 330 may be a combination of fixed and/or removable storage devices, such as fixed disc drives, removable memory cards, optical storage, SSD or flash memory devices, network attached storage (NAS), or connections to storage area-network (SAN) devices.

As shown, the memory 325 stores a stream manager 134. Additionally, the storage 330 includes a primary operator graph 335. The stream manager 134 may use the primary operator graph 335 to route tuples to PEs 235 for processing. The stream manager 134 is configured with a PE management component 340. Generally, the PE management component 340 is configured to detect problems occurring with one of the processing elements 235 containing a plurality of fused operators 240. For instance, the PE management component 340 could determine a particular processing element 235 is experiencing problems when the processing element 235 throws a particular exception. As another example, the PE management component 340 could monitor an error log for the particular processing element 235 and could determine that the processing element 235 is experiencing problems when a particular error message is detected within the error log. As yet another example, the PE management component 340 could monitor execution characteristics of the processing element 235 and could determine that a potential problem exists based on the monitored execution characteristics. For example, the PE management component 340 could monitor a particular processing element 235 and determine that although historically the processing element 235 used under a gigabyte of memory 225, the processing element 235 is currently using over 2 gigabytes of memory 225. As such, the PE management component 340 could determine the processing element 235 is using substantially more memory 225 than during historical executions and that this abnormal behavior indicates a potential process likely exists with the processing element 235.

Upon detecting that a processing element 235 is experiencing problems, the PE management component 340 could select one or more of the fused operators 240 within the processing element 235 for removal. For example, upon detecting that a particular exception was thrown, the PE management component 340 could determine which of the fused operators 240 generated the exception and could select that operator 240 for removal. That is, by removing the operator 240 generating the exception, the PE management component 340 may prevent the problematic operator 240 from disrupting the other operators in the processing element 235. Advantageously, doing so allows for problems within a processing element 235 to be corrected without interrupting all of the operators 240 within the processing element.

For example, consider a scenario where the PE management component 340 detects that a particular processing element 235 is using substantially more system memory 225 than at historical levels and further determines that the processing element 235 is close to using a maximum allowed amount of memory (e.g., a maximum amount of memory defined for a Java virtual machine). Ordinarily, such a processing element 235 may need to be restarted or otherwise taken offline to correct the issue causing the processing element 235 to consume substantially more memory. However, such actions would disrupt the processing of each operator 240 within the processing element 235. This in turn may affect other operators with the stream computing application (e.g., operators that are upstream and downstream from the operators 240 within the processing element 235). However, embodiments described herein may selectively remove only particular ones of the operators 240 from the processing element 235, thereby allowing the remaining operators to continue their processing uninterrupted. Advantageously, doing so minimizes the impact of any problems within the processing element 235 on the stream application as a whole.

In one embodiment, the PE management component 340 is configured to determine a relative priority of each of the fused operators 240 and to select one or more of the fused operators 240 based on the determined priority information. For example, consider a processing element 235 that has grown so large that the process for the processing element (e.g., a Java virtual machine) runs out of memory. In such a scenario, the PE management component 340 may remove the lowest priority operators from the processing element 235 in order to reduce the memory consumption of the processing element 235. The PE management component 340 may then remove the selected operator from the processing element 235. For instance, in an embodiment where each of the fused operators 240 runs in a separate thread within the processing element process, the PE management component 340 could terminate the thread associated with the selected operators. As another example, the PE management component 340 could modify the operator graph 335 to remove any reference to the selected operators 240, such that no traffic from the other operators is routed to the selected operator. Advantageously, doing so enables the stream computing application to selectively remove operators within a problematic processing element, while allowing any higher priority operators within the processing element to continue their processing uninterrupted.

Figure 4:
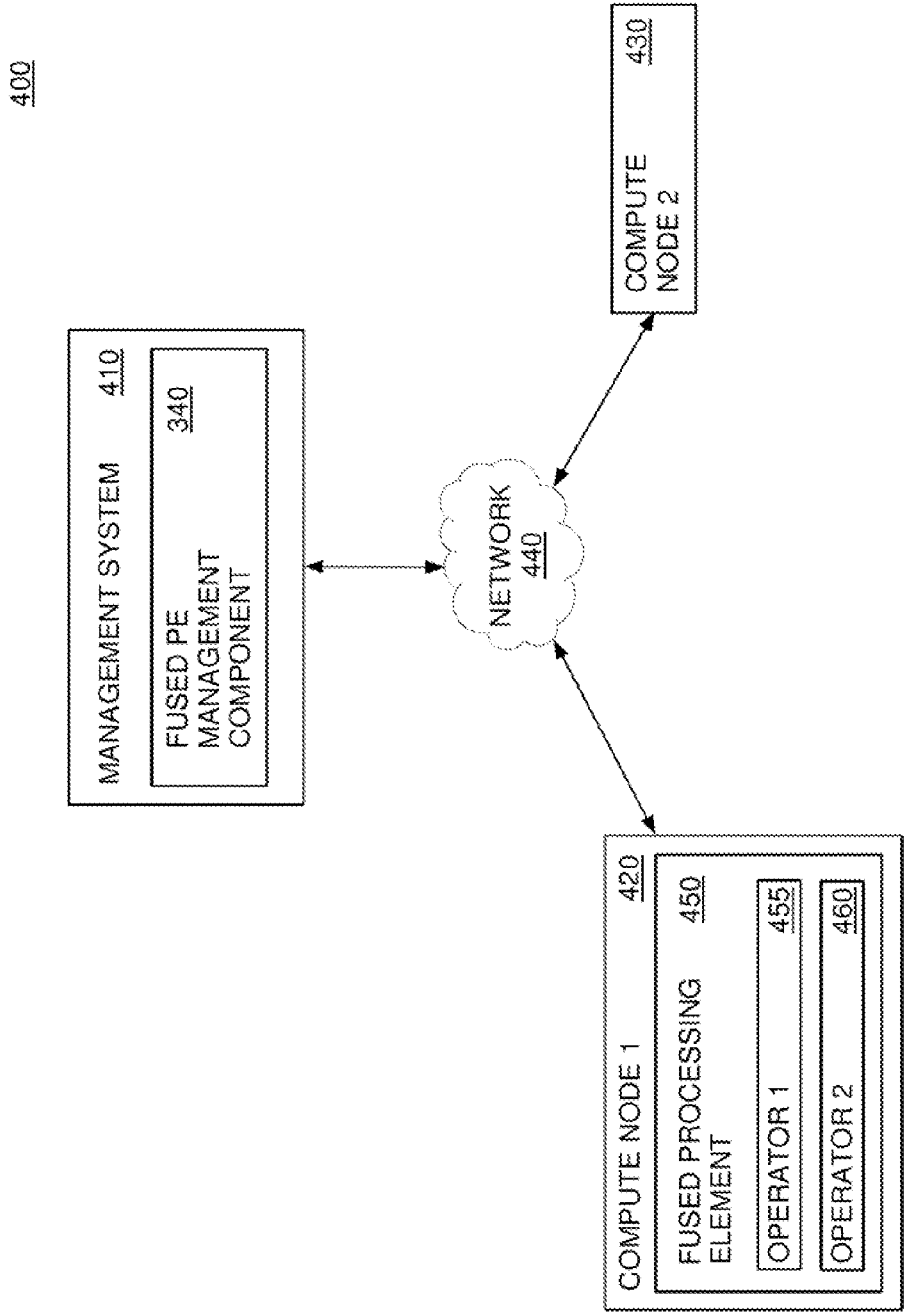
FIG. 4 is a block diagram illustrating a stream computing environment configured with a PE management component, according to one embodiment described herein.

FIG. 4 is a block diagram illustrating a stream computing environment configured with a PE management component, according to one embodiment described herein. As shown, the system 400 includes a management system 410 and two compute nodes 420 and 430, interconnected via a network 440. As shown, the management system 410 contains a PE management component 340. As discussed above, the PE management component 340 is generally configured to detect problems occurring within a processing element containing a plurality of fused operators and to selectively remove particular ones of the fused operators in order to remedy the detected problems.

In the depicted embodiment, the compute node 420 contains a fused processing element 450, which contains the operators 455 and 460. As discussed above, a plurality of operators (e.g., operators 455 and 460) may be fused, such that the operators are contained within a single process (e.g., fused processing element 450). For instance, each operator could be implemented to run in one or more threads within the processing element 450. Advantageously, by fusing the operators 455 and 460 into a single process, the operators 455 and 460 may communicate with one another very efficiently and without requiring any form of "transport" (e.g., a network socket, a TCP/IP socket, or shared memory). That is, when processes are fused together, the fused processing elements can use more rapid communication techniques for passing tuples (or other data) among the operators within a processing element.

However, because the operators 455 and 460 reside within a single process (i.e., the processing element 450), the operators 455 and 460 will both be terminated when the processing element 450 is terminated. As such, an error from one of the operators 455 can potentially bring the other operator 460 within the processing element 450 offline, even though the other operator 460 did not experience any errors. Of note, although only two operators 455 and 460 are shown within the processing element 450, such a depiction is without limitation and for illustrative purposes only. More generally, a processing element may contain any number of fused operators and these problems are more pronounced in embodiments where a processing element contains a substantial number of fused operators. That is, the more operators contained within a processing element, the greater the chance that one of the operators will experience an error and potentially bring all of the fused operators offline.

Accordingly, embodiments described herein provide techniques for managing execution of a processing element containing a plurality of fused operators. For instance, the PE management component 340 could monitor the execution of the processing element 450 in order to detect when an error condition has been satisfied by the processing element 450. For example, one such error condition could be when the processing element 450 generates a particular exception or error message (i.e., in an error log file). As another example, another error condition could be when the PE management component 340 detects that the processing element 450 is using substantially more system resources (e.g., memory, CPU, etc.) than the processing element 450 has historically used or when its resource usage exceeds a threshold amount of resources.

Upon detecting that the processing element 450 has satisfied an error condition, the PE management component 340 may select at least one of the fused operators 455 and 460 for removal from the processing element 450. In one embodiment, the PE management component 340 is configured to determine which of the fused operators 455 and 460 caused the error condition to be satisfied. For example, the PE management component 340 could determine which of the operators 455 and 460 generated an exception causing the error condition to be satisfied. In another embodiment, the PE management component 340 is configured to identify a relative priority of each of the operators 455 and 460 and to select one of the operators 455 and 460 for removal based upon the determined priorities. For instance, the PE management component 340 could determine the operator 455 is a higher priority operator while the operator 460 is a lower priority operator. The PE management component 340 could then select the lower priority operator 460 for removal from the processing element 450. Such priority may be relative to the other ones of the operators 455 and 460 within the processing element 450. In one embodiment, the priority is relative to other operators within other processing elements of the stream computing application.

The PE management component 340 may then remove the selected at least one fused operator from the first processing element. For instance, upon selecting the operator 460 for removal from the processing element 450, the PE management component 340 could remove the operator 460 from the processing element 450. As an example, in an embodiment where each of the operators 455 and 460 is implemented using one or more threads within the process for the processing element 450, the PE management component 340 could terminate the thread(s) associated with the selected operator 460. Advantageously, doing so allows the PE management component 340 to selectively remove particular operators from a processing element in order to remedy a problem with the processing element, without interrupting the processing of the other fused operators within the processing element.

Upon removing the selected operator(s), the PE management component 340 may be configured to redeploy the removed operator(s) to another processing element within the stream computing application. Such a redeployment may be advantageous, for instance, when the operator 460 itself was not causing the problem but rather the combination of the operator 460 and the other operator 455 within the processing element 450 was the source of the problem. For example, a problem could arise when the operators 455 and 460 are fused into a single process (i.e., processing element 450) because the process consumes an excessive amount of memory and may exceed the maximum allowed memory consumption for the process. However, such a problem may be remedied when the operators 455 and 460 are unfused and reside in separate processes. As another example, the problem could be caused by an incompatibility between the operator 460 and the node 420. For example, the node 420 could have insufficient system resources (e.g., CPU, memory, etc.) to support the operator 460. However, the PE management component 340 could remedy such a problem by redeploying the operator 460 to a more suitable node (e.g., compute node 430).

Figure 5:
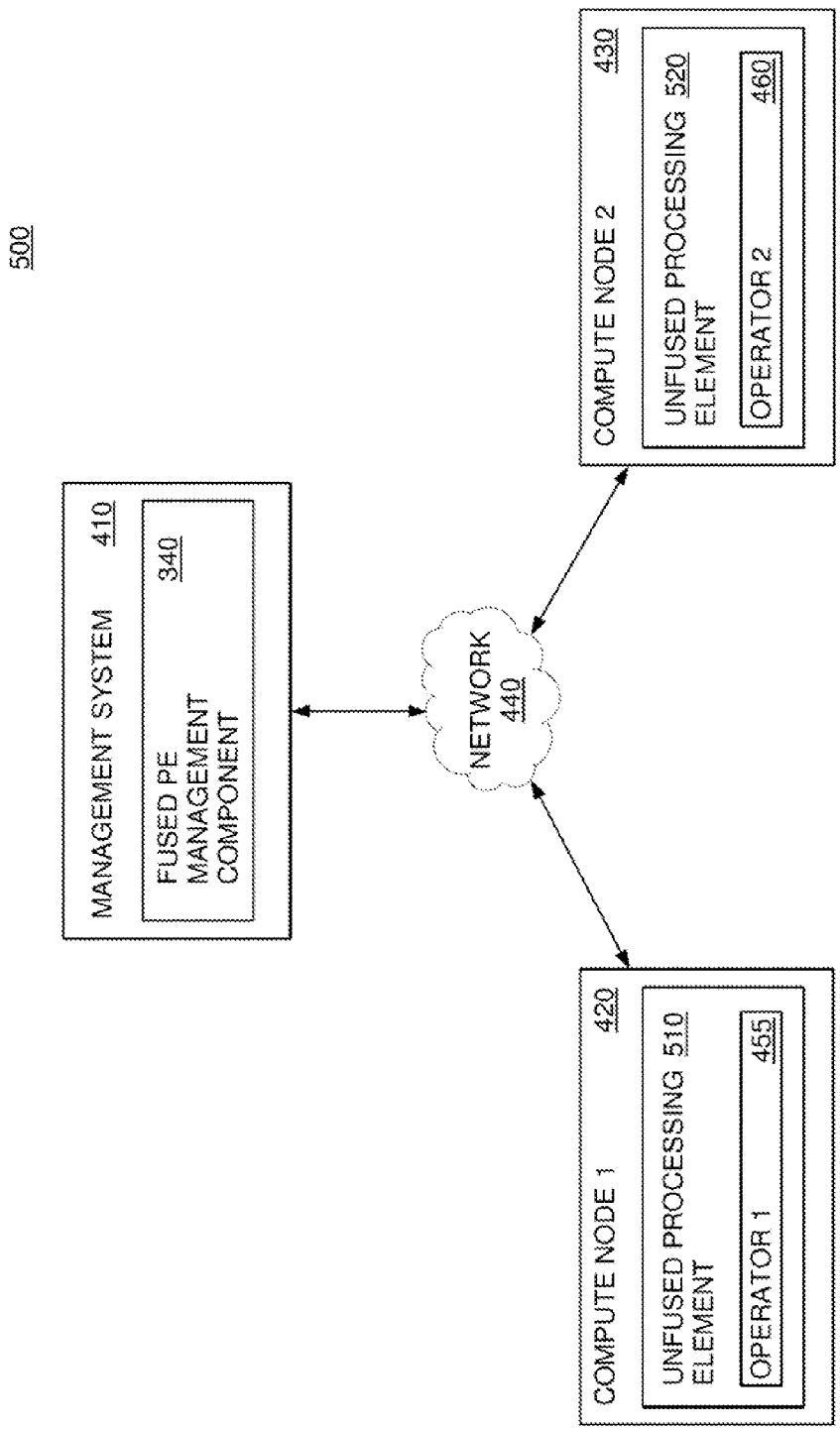
FIG. 5 is a block diagram illustrating a stream computing environment configured with a PE management component, according to one embodiment described herein.

An example of a redeployed operator is shown in FIG. 5, which is a block diagram illustrating a stream computing environment configured with a PE management component, according to one embodiment described herein. For purposes of this example, assume that the PE management component 340 selected the operator 460 for removal and has removed this operator 460 from the processing element 450. As shown, the system 500 includes the management system 410 and compute nodes 420 and 430, interconnected via the network 440. The management system 410 includes a PE management component 340.

The compute node 420 includes a processing element 510, which corresponds to the processing element 450 shown in FIG. 4 and discussed above. However, in the depicted embodiment, the PE management component 340 has removed the operator 460, leaving only the operator 455 within the processing element 510. Additionally, the PE management component 340 has redeployed the removed operator 460 to a second processing element 520, which is running on the compute node 430. Advantageously, doing so remedies the problem with the processing element 450 by removing the operator 460, while allowing the removed operator 460 to remain within the stream computing application. As part of such a redeployment operation, the PE management component 340 may be further configured to update the operator graph for the stream computing application to account for the redeployed operator 460 now running within the processing element 520.

Figure 6:
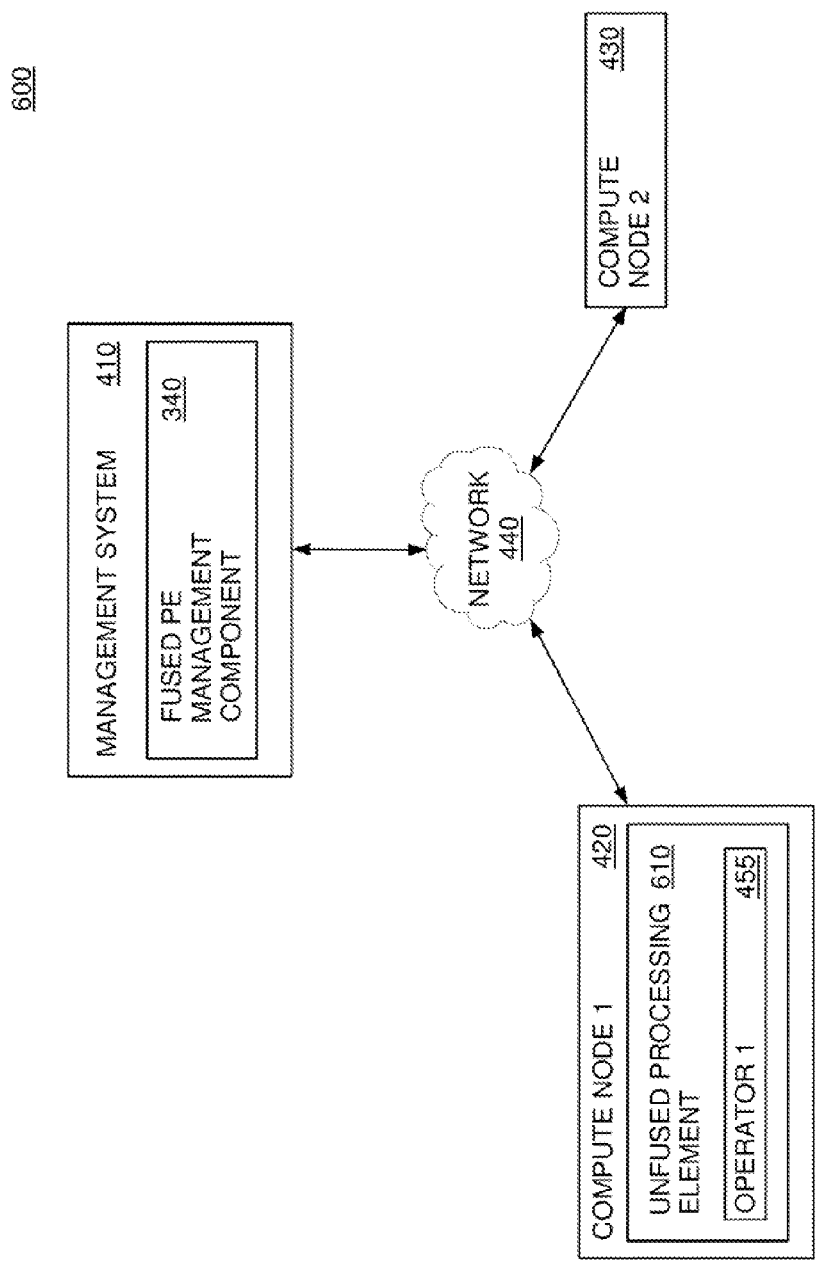
FIG. 6 is a block diagram illustrating a stream computing environment configured with a PE management component, according to one embodiment described herein.

In some circumstances, redeployment may not be a sufficient solution to remedy a problematic operator (e.g., operator 460). For example, consider an operator which is generating exceptions due to a remote service being offline or simply due to mistakes within the code for the operator. In such circumstances, the PE management component 340 could be configured to remove the operator from its processing element without any redeployment of the operator. An example of this is shown in FIG. 6, which is a block diagram illustrating a stream computing environment configured with a PE management component, according to one embodiment described herein. As shown, the system 600 includes the management system 410, and the compute nodes 420 and 430, interconnected via the network 440. The management system 410 is configured with the PE management component 340.

As shown, the compute node 420 contains the processing element 610 containing only the operator 455. That is, in the depicted example, the PE management component 340 has selected the operator 460 for removal from the processing element 450 and accordingly removed the operator 460 from the processing element 450. However, unlike the system 500 shown in FIG. 5, the PE management component 340 has determined not to redeploy the operator 460 in the depicted embodiment. For instance, the PE management component 340 could determine whether to redeploy a particular operator based upon the problems occurring within the processing element. As an example, if the PE management component 340 determines that the processing element is consuming a substantial amount of memory relative to historical memory levels or a predefined threshold level of memory, the PE management component 340 could determine that such a problem may be remedied by removing one or more fused operators from the processing element and by redeploying these removed operators elsewhere within the stream computing environment (e.g., in a different processing element on the same node or on a different node). On the other hand, if the PE management component 340 detects that an operator within the processing element is generating a substantial number of exceptions, the PE management component 340 could determine that redeployment of the problematic operator is unlikely to resolve the problem with the operator. Accordingly, the PE management component 340 may remove the problematic operator from the processing element without redeploying the removed operator within the stream computing application.

In one embodiment, upon removing an operator from a processing element, the PE management component 340 is configured to generate a notification for the removed operator. For example, such a notification could specify which operator(s) were removed, the processing element the operators were removed from, and the circumstances leading to the removal of the operator(s) (i.e., which error condition was satisfied). The notification could further specify any remedial action that was performed by the PE management component 340. For example, the notification could specify that the operator was redeployed within the stream computing application and could further specify which processing element and compute node the operator was redeployed to. Such a notification could then be transmitted, for example, to a system administrator of the stream computing application. Advantageously, doing so allows the PE management component 340 to automatically perform a remedial action upon detecting a problem within a stream computing application, while still alerting system administrators of the stream computing application to the problem.

Figure 7:
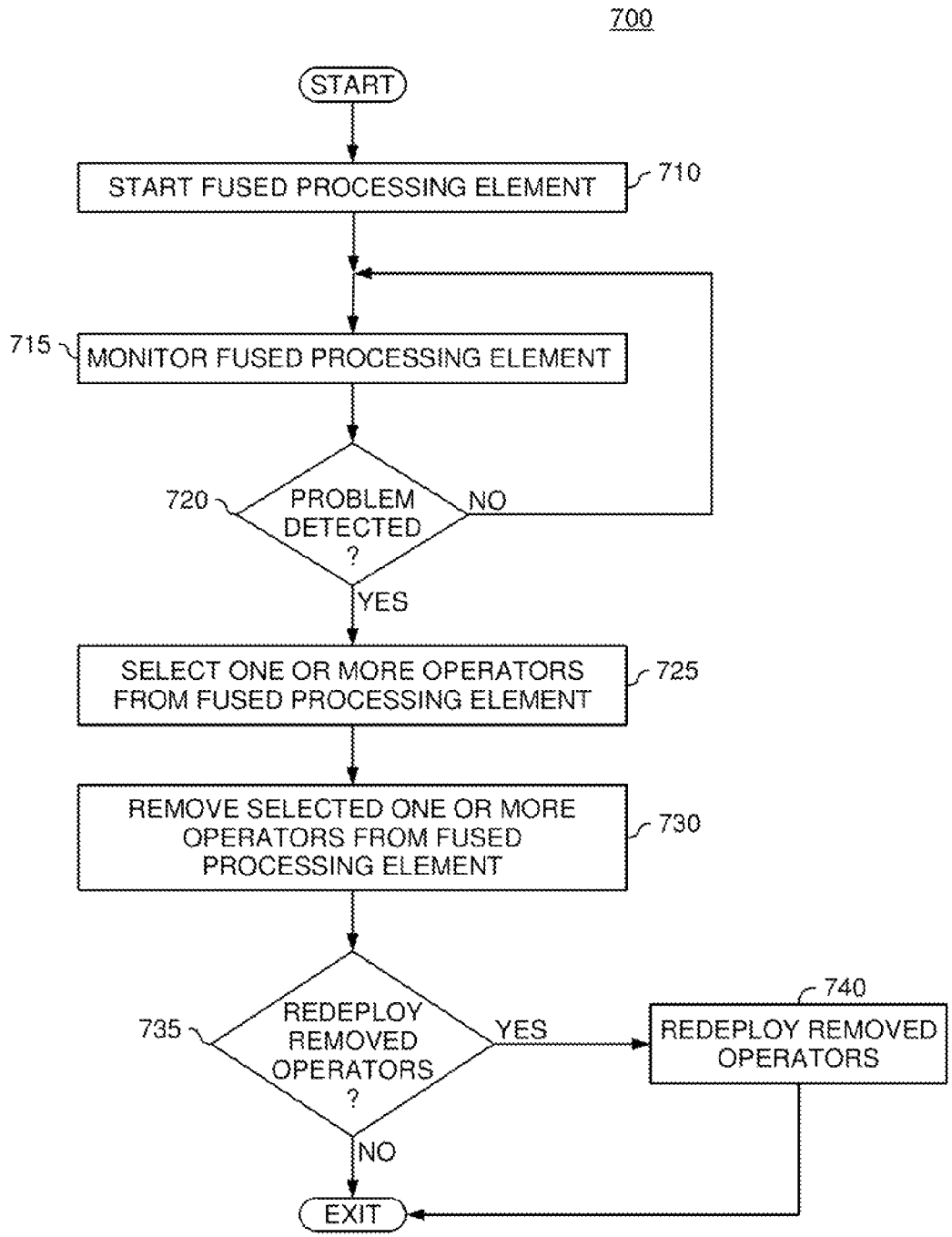
FIG. 7 is a flow diagram illustrating a method for removal operators from a fused processing element, according to one embodiment described herein.

FIG. 7 is a flow diagram illustrating a method for removal operators from a fused processing element, according to one embodiment described herein. As shown, the method 700 begins at step 710, where a processing element containing a plurality of fused operators is started. The PE management component 340 then monitors the execution of the processing element (step 715). For example, the PE management component 340 could monitor exceptions thrown by the processing element as well as errors (i.e., in error logs) generated by the processing element. Additionally, the PE management component 340 could monitor data buffers of the operators within the processing element to determine whether any of the operators are experiencing backpressure (i.e., when, in some period of time, the operators are receiving more data from upstream operators than the operators can process). As yet another example, the PE management component 340 could monitor execution characteristics of the processing element such as CPU usage, memory usage, and so on.

The then determines whether there are any problems or potential problems for the processing element (step 720). For instance, the PE management component 340 could determine that a problem exists for the processing element upon detecting that the processing element has thrown one or more exceptions. As another example, the PE management component 340 could determine a potential problem exists for the processing element when the processing element is consuming a substantial amount of system memory and is nearing the maximum memory amount allowed. If the PE management component 340 determines no problems have occurred for the processing element, the method 700 returns to step 715, where the PE management component 340 continues monitoring the processing element.

If instead the PE management component 340 has detected a problem with the processing element, the PE management component 340 selects one or more of the fused operators within the processing element for removal (step 725). As discussed above, the PE management component 340 could determine one or more of the fused operators responsible for the problem (e.g., the operator that generated the thrown exception) and could select the responsible operator(s) for removal. As another example, the PE management component 340 could determine a relative priority for each of the fused operators within the processing element and could select one or more of the fused operators based on the determined priorities. As yet another example, the PE management component 340 could randomly select one or more of the operators within the processing element for removal. Of course, all of the above examples are provided without limitation and for illustrative purposes only, and more generally, any technique for selecting one or more of the operators consistent with embodiments described herein may be used.

The PE management component 340 then removes the selected operators from the processing element (step 730). For example, in an embodiment where each of the fused operators is implemented using one or more threads within the process for the processing element, the PE management component 340 could terminate the threads associated with the selected operator. As another example, the PE management component 340 could remove any reference to the selected operator from the operator graph, such that no traffic within the stream computing application is routed to the selected operator.

The PE management component 340 then determines whether to redeploy the removed operators (step 735). Such a determination could be based on, for instance, the problem that was detected with the processing element above at step 720. For instance, if the PE management component 340 determined that the processing element was consuming a substantial amount of system memory and was nearing a maximum allowable amount of memory, the PE management component 340 could determine that the removed operator(s) are not themselves problematic and could run successfully if redeployed to another process (e.g., another processing element on the same node or on a different node in the stream computing environment). As another example, if the PE management component 340 determined that a particular one of the operators was generating exceptions and was outputting error messages to an error log, the PE management component 340 could determine that the particular operator is itself problematic and could further determine that the particular operator would likely not run successfully if redeployed.

Upon determining that the removed operator(s) should be redeployed, the PE management component 340 redeploys the removed operator(s) to one or more other processing elements (which could reside on the same compute node, different compute node(s), or a combination therebetween). Once the removed operator(s) are redeployed, or if the PE management component 340 determines that the removed operator(s) should not be redeployed, the method 700 ends. Advantageously, the method 700 enables operators to be selectively removed from a problematic processing element in order to remedy the problem with the processing element and does so in a way that avoids interrupting the other operators on the processing element.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a stream computing application configured with a fused PE management component could execute across one or more nodes within the cloud. The fused PE management component within the stream computing application could detect problems occurring with a fused processing element within the stream computing application, the fused processing including a plurality of fused operators. The fused PE management component could then select one of the plurality of fused operators for removal from the fused processing element and could remove the selected operator in order to resolve the problems occurring with the fused processing element without interrupting the processing of the other fused operators for the fused processing element. Doing so provides an enhanced stream computing application which users may access from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations, can be implemented by special-purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method of managing a processing element, comprising:
    receiving streaming data to be processed by a plurality of processing elements, the processing elements processing at least a portion of the received data by operation of one or more computer processors;
    establishing an operator graph of the plurality of processing elements, the operator graph defining at least one execution path and wherein at least one of the processing elements of the operator graph is configured to receive data from at least one upstream processing element and transmit data to at least one downstream processing element;
    detecting an error condition has been satisfied at a first one of the plurality of processing elements, wherein the first processing element contains a plurality of fused operators;
    selecting at least one of the plurality of fused operators for removal from the first processing element, comprising:
        determining priority information specifying a respective priority for each of the plurality of fused operators; and
        selecting a fused operator having a lowest priority for removal from the first processing element based on the determined priority information; and
    removing the selected at least one fused operator from the first processing element.

2. The method of claim 1, wherein the selected at least one fused operator is removed from the first processing element without interrupting the processing of the other fused operators in the plurality of fused operators.

3. The method of claim 1, wherein the error condition is at least one of (i) an occurrence of one or more exceptions, (ii) an occurrence of one or more error messages, and (iii) one or more system workload conditions.

4. The method of claim 1, further comprising:
    creating a second processing element containing the removed at least one fused operator;
    initiating execution of the second processing element; and
    updating the operator graph to reference the created second processing element.

5. The method of claim 4, wherein the first processing element is hosted on a first compute node, and further comprising:
    selecting a second compute node suitable to host the second processing element,
    wherein the second processing element is executed on the selected second compute node, and wherein the operator graph is updated to reference the second processing element on the selected second compute node.

6. The method of claim 1, wherein selecting at least one of the plurality of fused operators further comprises:
    identifying one or more fused operators from the plurality of fused operators causing the error condition; and
    selecting the identified one or more fused operators for removal.

* * * * *